F. W. MANNING
PROCESS OF AND APPARATUS FOR THE CONTINUOUS REFINING OF LUBRICATING OILS OF INTERNAL COMBUSTION ENGINES.
April 15, 1930.
Original Filed Nov. 10, 1926
3 Sheets-Sheet 1
Re. 17,644
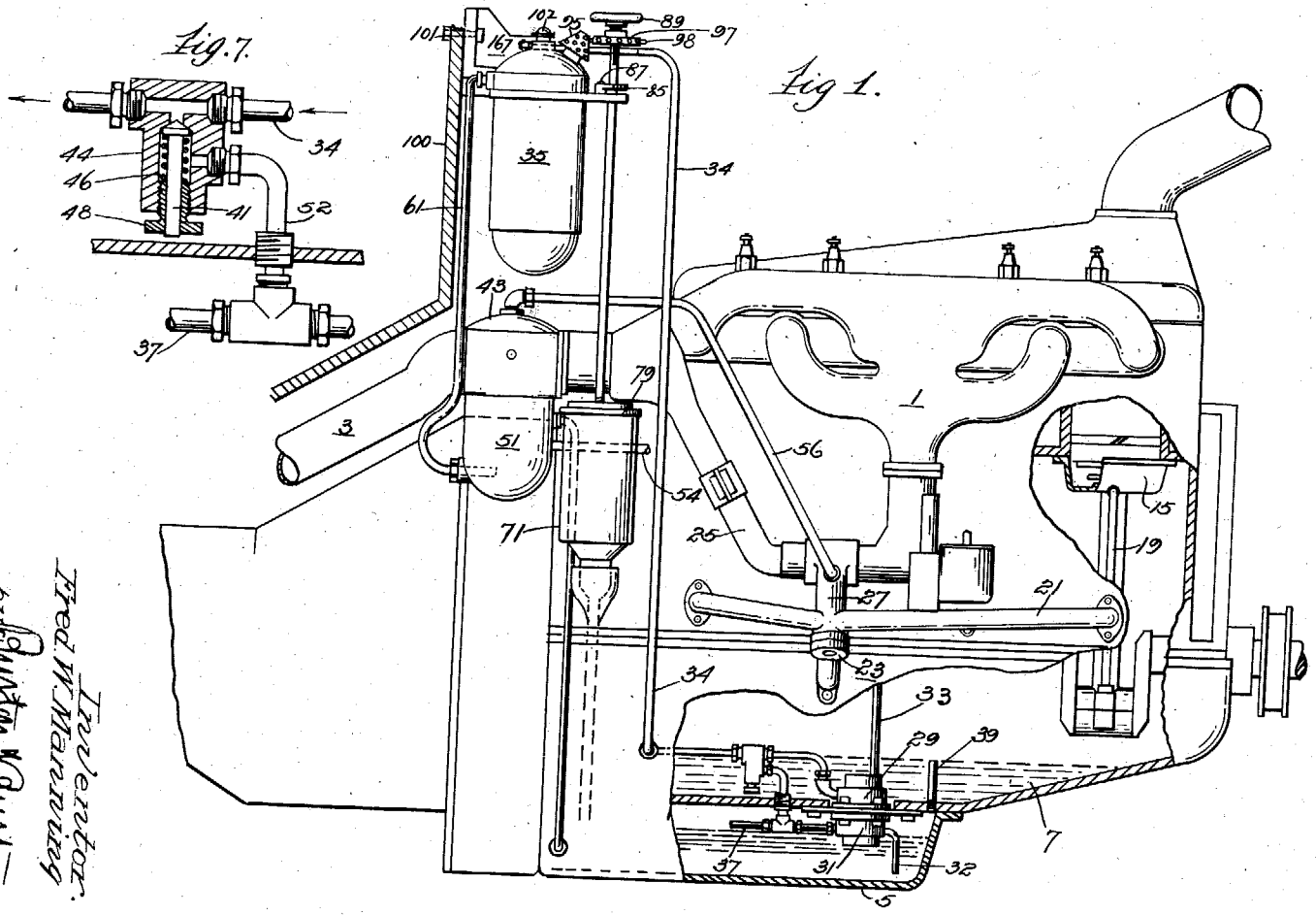
Inventor.
Fred. W. Manning
by Burton & Burton
Attorneys.

F. W. MANNING

PROCESS OF AND APPARATUS FOR THE CONTINUOUS REFINING OF LUBRICATING OILS OF INTERNAL COMBUSTION ENGINES

3 Sheets-Sheet 2

April 15, 1930. Original Filed Nov. 10, 1926 Re. 17,644

Inventor
Fred W. Manning by Burton & Burton
Attorneys.

F. W. MANNING
PROCESS OF AND APPARATUS FOR THE CONTINUOUS REFINING OF LUBRICATING OILS OF INTERNAL COMBUSTION ENGINES
3 Sheets-Sheet 3
April 15, 1930. Original Filed Nov. 10, 1926 Re. 17,644
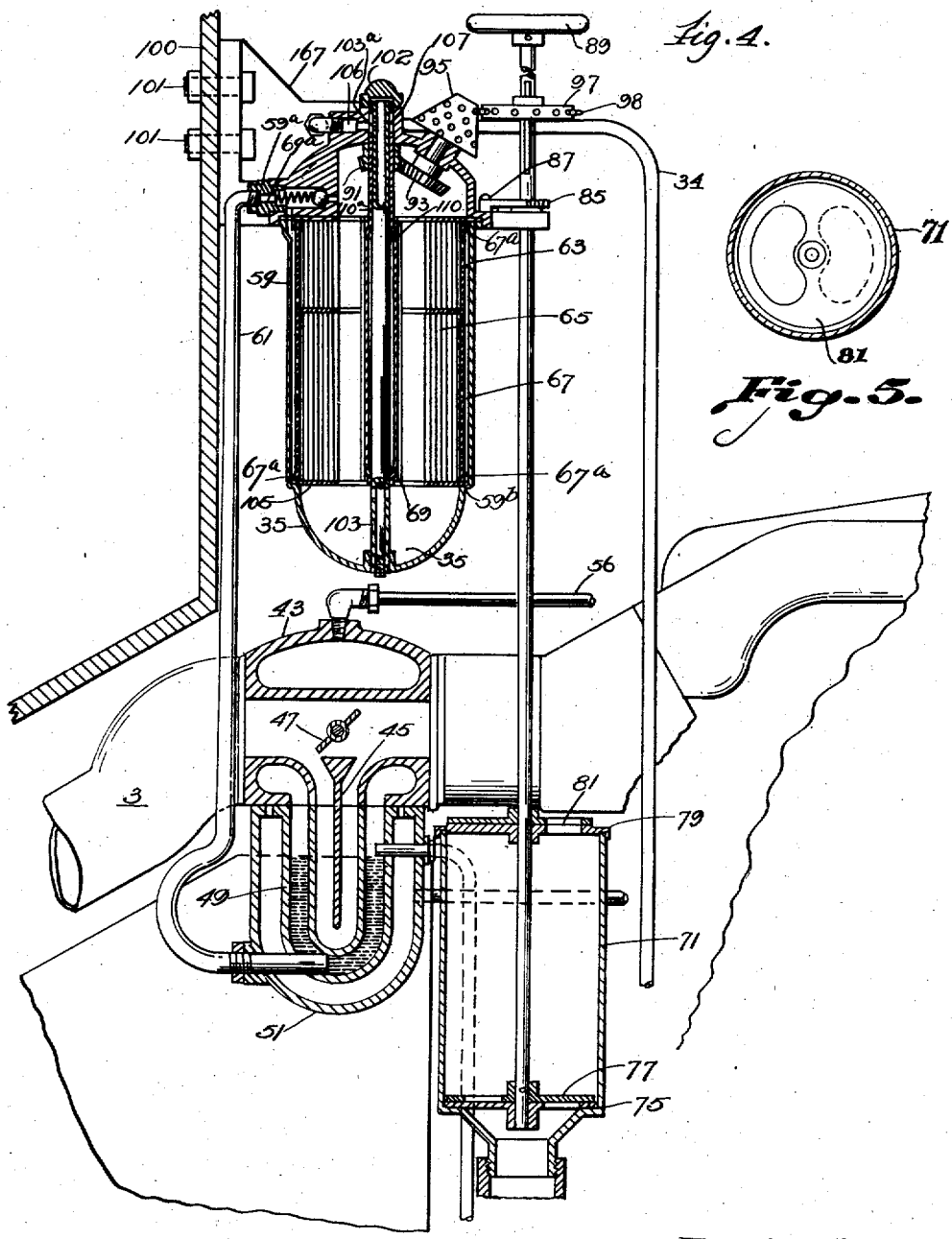
Witness
H. W. McKnight
Inventor
Fred W. Manning
by Burton & Burton
Attorneys.

Reissued Apr. 15, 1930 Re. 17,644

UNITED STATES PATENT OFFICE

FRED W. MANNING, OF BERKELEY, CALIFORNIA, ASSIGNOR, BY DIRECT AND MESNE ASSIGNMENTS, TO STEWART-WARNER CORPORATION, OF CHICAGO, ILLINOIS, A CORPORATION OF VIRGINIA

PROCESS OF AND APPARATUS FOR THE CONTINUOUS REFINING OF LUBRICATING OILS OF INTERNAL-COMBUSTION ENGINES

Original No. 1,729,746, dated October 1, 1929, Serial No. 147,481, filed November 10, 1926. Application for reissue filed November 27, 1929. Serial No. 410,272.

This invention relates to the treatment of liquids for effecting their purification or other desired improvements in their characteristics, but more particularly it relates to a method and means for the continuous purification of lubricating oils of internal combustion engines during operation, by distillation, clarification, decolorization, or other treatment.

It is well known that during the operation of an internal combustion engine, the lubricating oil becomes contaminated with solid impurities such as road dust, metal and carbon particles, and the abrasive action of these impurities is often accentuated by dilution of the lubricating oil caused by the addition of fuel oil entrained with the explosive mixtures, or which condenses out of the mixture when the engine is cold in starting, or by water resulting chiefly from the condensation of the burned gases especially when the engine is cold. The liquid fuel and water leak or are blown past the pistons and may carry down into the crank case more or less of solid impurities, other solid impurities enter the lubricating system through the breather and from other sources.

Present practice is to eliminate the solid impurities, such as metal particles, road dust, etc., by constantly by-passing a portion of the oil from the lubricating system through a filter medium whose texture or porosity is incapable of completely retaining the fine carbon, and then returning the partially purified oil to the crank case reservoir to be mixed with the contaminated oil escaping from the parts lubricated. The incomplete elimination of the carbon, results in the constant deterioration of the oil, and this deterioration is often made more rapid by dilution. Finally the oil must be completely discarded.

It is therefore an object of this invention to continuously eliminate the carbon residue resulting from decomposition of the less valuable elements of the oil, and by also eliminating the other solid and liquid contaminations to constantly improve the value of the oil, and thereby make any waste or drainage of the oil unnecessary.

It is a further object of this invention to decrease the decomposition of oil in the cylinders and the resulting carbon residue, and to completely refine the oil before any of it reaches the parts to be lubricated.

With the above and other objects in view, the invention will be understood by reference to the following description, taken in conjunction with the accompanying drawings which illustrate a preferred form of apparatus for carrying out my invention.

In the drawings:

Fig. 1 is a side elevation of an internal combustion engine showing the relative positions of the refining devices.

Fig. 4 is a sectional elevation of the magazine filter and oil feeding device.

Fig. 5 is a plan view of the oil feeding device.

Fig. 7 is a transverse section of the by-pass arrangement between the oil filter pump and the oil distribution pump discharge lines.

Figures 2, 3, 6:
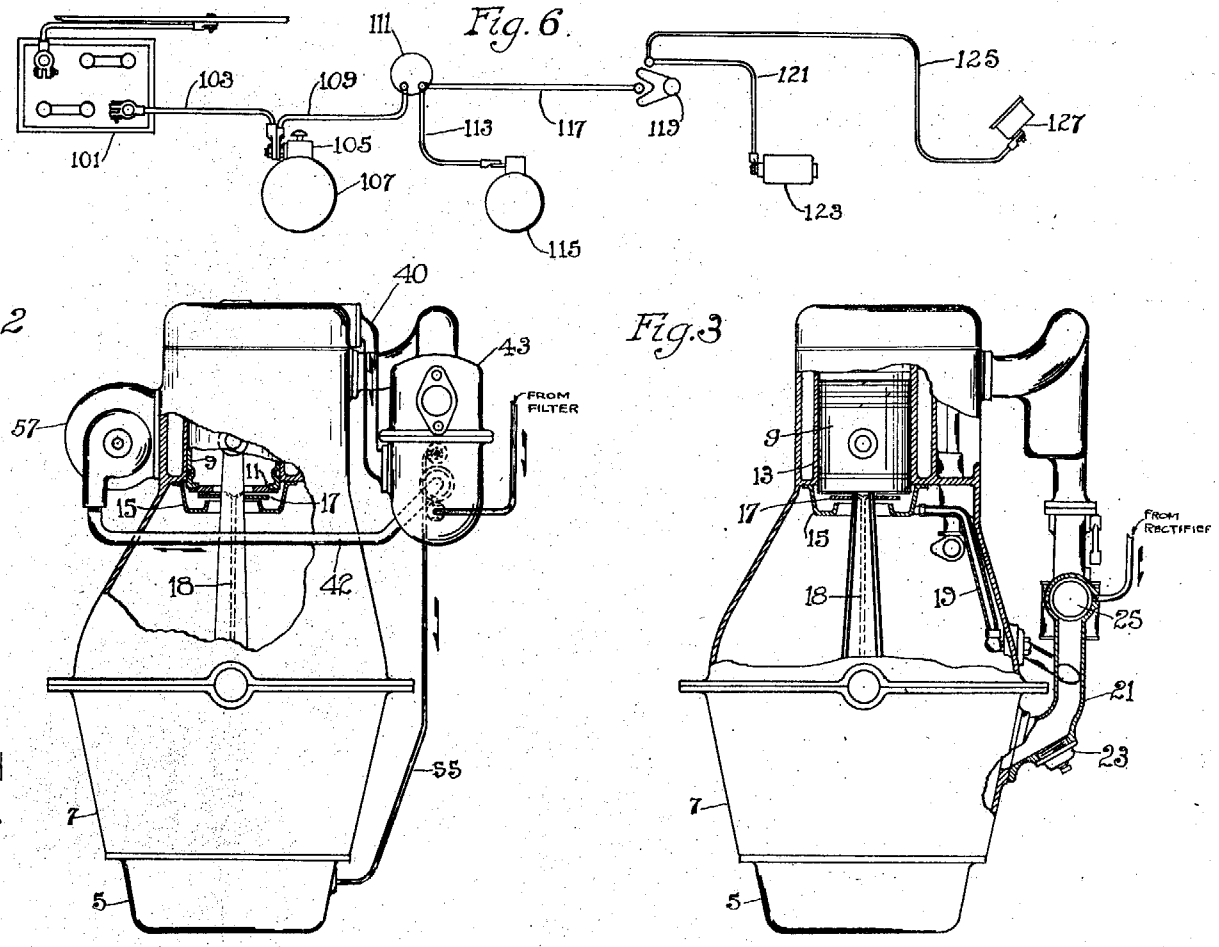
Fig. 2 is an end view of an engine showing the exhaust manifold distillation apparatus, the water pump, and drip pan chambers.
Fig. 3 is a fragmentary end view of an engine showing the drip pan chamber and electric distillation apparatus.
Fig. 6 is a diagrammatic arrangement of the wiring connections for the electric distillation apparatus.

Referring more specifically to the drawings by reference characters:

Figs. 1, 2, and 3 show several views of a four-cylinder engine in which 1 is the intake manifold, 3 the exhaust manifold, 5 a primary reservoir for new oil and the purified oil from the refining devices, and 7 a secondary reservoir for the contaminated oil escaping from the parts lubricated. The lower end of piston 9 is closed by plate 11 which may be attached in halves to facilitate the attachment of the upper end of the connecting rod to the piston. The lower end of cylinder 13 is enclosed by drip pan 15 and both plate 11 and drip pan 15 have elongated slots to allow for the angular movement of the connecting rod, and between them and attached to the connecting rod is a vapor deflecting plate 17. The cylinder walls are lubricated by means of a thermostatically controlled oil passage 18 running lengthwise through the connecting rod which throws the oil onto the walls from openings in the connecting rod situated between piston plate 11 and deflecting plate 17. Pipe line 19 connects the drip pan to the drain manifold 21 in the lower portion of which is placed an electric hot plate 23 thermostatically controlled to a constant heat. The drain manifold is connected, directly below the hot plate, to the secondary reservoir, and directly above the hot plate, to the air intake pipe 25 by means of connection 27.

Filter pump 29 and distributing pump 31, are both driven by the engine through shaft 33. Pump 29 delivers the contaminated oil from the bottom of the secondary reservoir through pipe 34 to the filter 35 and distributing pump 31 delivers the purified oil from the bottom of the primary reservoir through pipe 37 to the parts to be lubricated. An overcharge of new or refined oil into the primary reservoir will result in an overflow through pipe 39 into the secondary reservoir, and an insufficient supply of oil in the primary reservoir for the bearings with resulting drop in pressure, will immediately cause the by-pass valve 41 between the discharge lines of the two pumps to open and allow the discharge line 37 of the distributing pump to be supplied by the discharge line 34 from the filter pump. The by-pass valve may be placed in valve body 44 in the filter discharge line and the by-passed oil discharged through line 52 into the pure oil distribution line, and the pressure at which the valve opens may be regulated by spring 46 and adjusting nut 48 as shown in Figure 7.

Distillation apparatus 43 is placed in the exhaust manifold and the gases deflected through its baffled portion 45 may be regulated by damper 47. The filtered oil, coming from the filter from which the dilution is to be removed, enters the annular middle portion 49 surrounding the path for the exhaust gases, and is maintained at a constant heat by means of the water circulation through the outer jacket 51, the temperature of which is controlled by thermostat in a customary manner not shown, and after passing through the distillation chamber flows by gravity through pipe line 55 into the primary reservoir. Water pump 57 maintains the necessary circulation of cooling fluid through the engine jacket, pipe line 40, regulating jacket 51, and the return pipe line 42. The distilled vapors are carried by a very low suction through pipe 56 into the air intake pipe 25 or may be connected to, and allowed to escape through the exhaust manifold. A mechanical agitator driven by the incoming oil, may be placed in the distillation chamber.

Fig. 4 shows the magazine filter described in patent application Serial No. 117,045, filed June 19th, 1926, consisting of a filter casing 59 forming a container for a refill cylinder 67 containing filtrate fabric windings wrapped in the form of an annular ring on the inside of the refill cylinder, which is perforated and provided with beaded ends as seen at 67[a] spacing it out of contact with the casing thus affording drainage for filtered oil which passes into the outlet fitting 59[a] through the passage 69[a]. The top cover 167 is bolted to the cowl 100 by bolts 101 and is made tight to the filter casing by a cap nut 102, and the pipe 103, extending axially through the casing and refill cylinder and screwed into the bottom of the sump 35, which terminates the casing at the lower end; and by the same means the perforated refill cylinder is also held in position by being engaged between the upper end of the casing and the cover 167.

The refill cylinder obtains further support in the casing by means of a bottom plate 105, which is lodged on an interior shoulder 59[b], of the casing.

The oil enters the filter chamber from the pipe 34, through the inlet 106, and the annular space 107, around the axial pipe 103, which is afforded by stopping short the hub 110[a], of the spool, 110, which is mounted rotatably on said pipe.

The oil enters said pipe 103, through the ports of which one is seen at 103[a], and flows down through the pipe and out into the casing filling the sump and rising through the central opening in the plate 105, into the space between the spool 110, and the filtrate windings 63 and 65.

In the operation of the apparatus the oil passes radially outward through the refill windings and leaves the filter through pipe line 61 leading to the distillation apparatus. The refill is made up of clear filtrate windings 63 and free flow windings 65, the latter being of greater porosity than the former, but suitable to retain all granular material, such as road dust, metal particles, etc., and both windings are placed end to end within a perforated refill cylinder 67. The free flow windings are preferably removable, and both the free flow and clear filtrate windings may be removed from the annular rolls constituting the filter members, and rolled up upon the same winding spool 69 as they become contaminated. The oil will pass through the free flow windings at sufficient speed to supply all the bearings, and its speed through the clear filtrate windings although much slower will be sufficient to maintain the oil as it is pumped to the bearings, practically free from carbon and at constant clarity. If desirable, clear filtrate windings may be placed at the back of the free flow windings next the perforated refill cylinder, to polish up the oil after most of the solid contaminations have been removed by the free flow windings. The sealing means for the outer ends of the windings and the joint between the inner ends indicated respectively at 63[a] and 65[a], consist of a cementing material, such as shellac, lacquer, varnish, etc., and a filter material, such as asbestos, cotton linters, wood pulp, etc. Such a composition has sufficient resiliency not to crack when subject to cold oil and the vibrations of the car, will give absolute clarity to any oil that may pass through the sealing means, if it should soften when subject to hot oil, and at all times it will allow the windings to be removed from the annular roll under a slight tension and without danger of tearing the fabric. The cementing and filtering material is preferably mixed together before being applied to the ends of the windings, but may be applied separately. The sealing means may also consist of suitable filter pads of the same material as the clear filtrate windings attached by cementing material to the outer ends of the windings and a similar pad may be placed between the inner ends of the windings.

As the clogging of the windings is mostly due to carbon residue resulting from the carbonizing of the oil by the heat of the engine, the speed with which the contaminated windings is removed and wound upon the storage spool, should be proportional to the amount of fresh oil introduced into the primary reservoir. Such an arrangement is shown in Figs. 4 and 5. As no oil is ever drained or discarded, and as provision is made to decrease the consumption of oil by the engine to a minimum, a small container or measuring device screwed into the primary reservoir, will serve to introduce fresh oil when required. This container consists of a pressed steel shell 71 having a bottom valve plate 75 upon which is seated valve disc 77, and top cover or valve plate 79 upon which is seated the upper valve disc, 81. Both valve plates constitute a support for valve rod 83, and the openings through the valve plates and discs are arranged so that the outlet opening into the primary reservoir is closed when the inlet openings in the top valve plate and valve disc are coincident to admit new oil. A complete turn of the valve rod will then have to be made before another similar measure of oil can be poured into the primary reservoir. Wheel 85 and spring press pawl 87, prevent the valve rod being turned except in the desired direction and the turning is accomplished by hand wheel 89. The filter winding spool is operated by the valve rod through gears 91 and 93, cone 95 and driving disc 97, the latter sliding downwardly over feather key 99 as the windings are removed. The cone has recesses running spirally around it into which the driving disc pins 98 mesh and this arrangement makes possible the removal of the contaminated windings at a constant linear speed and in direct ratio with the introduction of new oil. The position of the driving disc in relation to the cone indicates when the filter will have to be charged with a new refill, after which charging the disc may be slipped upwardly to its first position.

Fig. 6 shows how the electric distillation apparatus may be connected up to the ignition switch. Storage battery 101 is connected by main feed wire 103 to the starting switch 105 of the motor 107, and the starting switch is connected by wiring 109 to ammeter 111. The ammeter's opposite terminal is connected by wiring 113 to the generator 115 and also by wiring 117 to ignition key 119, and the ignition key is connected by wiring 121 to ignition coil 123 and also by wiring 125 to the hot plate 127.

The operation of the apparatus thus constructed has been in part indicated in connection with the foregoing description. Excessive carbonization of the oil above, or on the inside of the piston, is prevented by lubricating the cylinder walls through the thermostatically controlled oil passage in the connecting rod and by preventing oil spray or mist from entering the lower ends of the cylinder and piston. The blow-by, whether in the form of liquid or vapor, is carried from the drip pan chamber through pipe line 19 into the drain manifold 21 and finally, the liquid portion flows over the hot plate 23. The oil now free from dilution but not solid contaminations, returns to the secondary reservoir, and the vapors are drawn by low suction through connection 27 into the air intake pipe. The oil in the secondary reservoir may be further contaminated by metal particles carried down by oil escaping from other parts lubricated, and also by water resulting from the condensation of atmospheric vapor.

Pump 29 forces the oil from the secondary reservoir through pipe line 34 to the filter where the solid contaminations are eliminated by means of the free flow and the clear filtrate windings. Any carbon that may pass through the free flow windings will be intercepted later on by the clear filtrate windings. The filtrate on leaving the filter flows by gravity through pipe line 61 to distillation chamber 49 where it is subject to a constant temperature by means of a thermostatically controlled water circulation through an outer annular jacket. The oil from which both solid and liquid contaminations have now been removed, flows by gravity to the primary reservoir for new and refined oil, from which it is pumped to the parts to be lubricated.

It will be evident from the foregoing description that the continuous refining of a sufficient supply of oil to lubricate all the moving parts of the engine and the preventing of any contamination of the refined oil until after it reaches the moving parts, should very greatly increase the life of the engine and decrease the amount of oil used, which then would be only equal to the consumption by the engine.

It will furthermore be evident that the lubrication of the cylinders by a definite amount of oil from the moment the engine is first turned over, will not only prevent the scoring of cold pistons and cylinders but will also considerably decrease the consumption of oil and resulting deposition of carbon.

It will also be seen that an electrical distillation apparatus would be a very convenient method for distilling the dilution in a motor used for short runs around town, where sufficient heat might not be supplied by an exhaust manifold distillation apparatus.

Having thus described my invention, what I claim is:

1. An apparatus for the purpose indicated comprising a reservoir for the liquid to be filtered connected for delivery of said liquid thereinto, a magazine filter containing a reserve of filter material, and means whereby the contaminated filter material is removed in direct ratio with the introduction of new oil into said reservoir.

2. In a filter, a filter member consisting of a free flow section and a clear filtrate section, a portion of said clear filtrate section being removable.

3. In a filter, a filter member consisting of a free flow section and a clear filtrate section, a portion of each section with the solids collected thereby being removable.

4. As an article of manufacture, a filter member for a magazine filter, said member comprising a plurality of layers of filter material, means sealing the edges of said layers against the entrance of solids, said sealing means consisting of a cementing and a filtering material.

5. An apparatus for the purpose indicated comprising a reservoir for the liquid to be filtered connected for delivery of said liquid thereinto, a source from which the contaminated liquid to be filtered is derived through said connection, a magazine filter device in said reservoir, said filter containing a reserve of filter material and rotatable for removing said contaminated filter material to bring the reserve into operation for filtering, a measuring container connected and arranged for predetermined movement to effect delivery of its measured content to said source, means for giving said container said predetermined movement, and operating connections from said means to the magazine for rotating the latter to remove the contaminated filter material and bring the reserve into operation in direct ratio to said movement of the container-operating means.

6. In the construction defined in claim 5, the operating connections from the container-operating means to the magazine comprising a conical spiral gear element operatively connected for rotating the magazine, and a spur gear member mounted for rotation by the container-operating means and meshing with said conical spiral gear element.

7. In a filtering apparatus, in combination with a chamber arranged to receive the liquid to be filtered, a filter member in said chamber consisting of two or more sections of varying porosity, one section being adapted to retain only the coarser solid impurities, another section being adapted to retain the finer as well as the coarser solid impurities, a portion of the said other section being removable, said sections being arranged relatively to each other in the chamber for exposure to the liquid to be filtered at different parts of the extent of said chamber, whereby one part of the liquid entering the chamber is filtered by the first mentioned section and another part by the second mentioned section.

8. A filtering process which consists in repeatedly circulating a liquid in a closed system, dividing the flow in the system and passing a comparatively large portion of the liquid through a porous filtering material, and a smaller portion through a filtering material of lesser porosity, and reuniting the two flows after their passage through the filter materials.

9. A filtering process which consists in repeatedly circulating a liquid in a closed system, dividing the flow in the system and passing a comparatively large portion of the liquid through a porous filtering material and a smaller portion through a filtering material of lesser porosity, reuniting the two flows after their passage through the filter materials, and removing the liquid inlet surface of the filtering material of lesser porosity to provide fresh filtering surface to the liquid to be filtered.

10. As an article of manufacture, a filter member for a magazine filter, said member comprising a plurality of layers of filter material, means sealing the edges of said layers against the entrance of solids, said sealing means consisting of a mixture of shellac and fibrous material.

11. The combination of a reservoir for liquid to be filtered, a magazine filter containing a reserve of filter material, said magazine filter connected to receive liquid from said reservoir, and means operable to permit new liquid to be introduced into the reservoir and simultaneously cause the contaminated filter material to be removed.

12. The combination of a reservoir for liquid to be filtered, a magazine filter containing a reserve of filter material, said magazine filter connected to receive liquid from said reservoir, and means operable to permit new liquid to be introduced into the reservoir and simultaneously cause liquid to pass through only a selected portion of the filter material.

13. The combination of a reservoir for liquid to be filtered, a filter containing filter material, said filter connected to receive liquid from said reservoir, and means operable to permit new liquid to be introduced into the reservoir and simultaneously cause the filter material to be renewed.

14. The combination of a reservoir for liquid to be filtered, a filter containing a magazine of filter material arranged to receive liquid from the reservoir for filtering by passage through filtering material of the magazine; means for removing from time to time from the path of the liquid through the magazine contamination filtered out from the previously passing liquid, for presenting to the incoming liquid uncontaminated filter material; means controlling access to the reservoir for supplying it with liquid, operatively associated with the first mentioned means, for removing the contamination in the process of opening the reservoir for renewing the liquid supply.

15. The construction defined in claim 14, the filtering material and the means for removing it being arranged to present in the path of the liquid through said filtering material only filtering material which is devoid of contamination.

16. The combination of a reservoir for liquid to be filtered, a filter containing a magazine of filter material, said filter being connected to receive liquid from said reservoir, means for removing from the path of the liquid through the filter material, contamination derived from previously passing liquid; means for replenishing the liquid supply to the reservoir, said last mentioned means co-operating with the first mentioned means for removing contamination simultaneously with replenishing the liquid supply.

FRED W. MANNING.